United States Patent
Moscovici et al.

(10) Patent No.: US 9,606,879 B2
(45) Date of Patent: Mar. 28, 2017

(54) MULTI-PARTITION NETWORKING DEVICE AND METHOD THEREFOR

(71) Applicants: Avishay Moscovici, Tel Aviv (IL); Nir Erez, Zur Moshe (IL)

(72) Inventors: Avishay Moscovici, Tel Aviv (IL); Nir Erez, Zur Moshe (IL)

(73) Assignee: NXP USA, INC., Austin, TX (US)

( * ) Notice: Subject to any disclaimer, the term of this patent is extended or adjusted under 35 U.S.C. 154(b) by 226 days.

(21) Appl. No.: 14/499,385

(22) Filed: Sep. 29, 2014

(65) Prior Publication Data
US 2016/0092323 A1    Mar. 31, 2016

(51) Int. Cl.
*G06F 11/00* (2006.01)
*G06F 11/20* (2006.01)
*G06F 11/07* (2006.01)

(52) U.S. Cl.
CPC ...... *G06F 11/2023* (2013.01); *G06F 11/0709* (2013.01); *G06F 11/0757* (2013.01); *G06F 11/2041* (2013.01); *G06F 2201/835* (2013.01)

(58) Field of Classification Search
CPC ............. G06F 11/2023; G06F 11/0709; G06F 11/0757; G06F 11/2033
See application file for complete search history.

(56) References Cited

U.S. PATENT DOCUMENTS 6,363,495 B1   3/2002   MacKenzie et al.
6,728,780 B1   4/2004   Hebert
2003/0046330 A1   3/2003   Hayes
2005/0081122 A1*  4/2005   Hiramatsu .......... G06F 11/2046 714/48
2012/0008506 A1   1/2012   Astigarraga et al.
2015/0006953 A1*  1/2015   Holbrook ............ G06F 11/0724 714/13
2015/0019909 A1*  1/2015   Griffith ............... G06F 11/1458 714/15
2015/0058682 A1*  2/2015   Nagumo ............... G06F 11/076 714/47.3
2015/0074219 A1*  3/2015   Chin ...................... G06F 9/467 709/213

(Continued)

OTHER PUBLICATIONS

U.S. Appl. No. 14/224,391, filed Mar. 25, 2014, entitled "Network Processor for Managing a Packet Processing Acceleration Logic Circuitry in a Networking Device".

*Primary Examiner* — Philip Guyton

(57) ABSTRACT

A multi-partition networking device comprising a primary partition running on a first set of hardware resources and a secondary partition running on a further set of hardware resources. The multi-partition networking device is arranged to operate in a first operating state, whereby the first set of hardware resources are in an active state and the primary partition is arranged to process network traffic, and the further set of hardware resources are in a standby state. The multi-partition networking device is further arranged to transition to a second operating state upon detection of a suspicious condition within the primary partition, whereby the further set of hardware resources are transitioned from a standby state to an active state, and to transition to a third operating state upon detection of a failure condition within the primary partition, whereby processing of network traffic is transferred to the secondary partition.

14 Claims, 9 Drawing Sheets

(56) References Cited

U.S. PATENT DOCUMENTS

2016/0004241 A1\* 1/2016 Yoshiike ............. G06F 11/2028
    700/2
2016/0092323 A1\* 3/2016 Moscovici .......... G06F 11/2023
    714/4.12
2016/0149773 A1\* 5/2016 Moscovici .......... H04L 41/5054
    714/4.12

\* cited by examiner

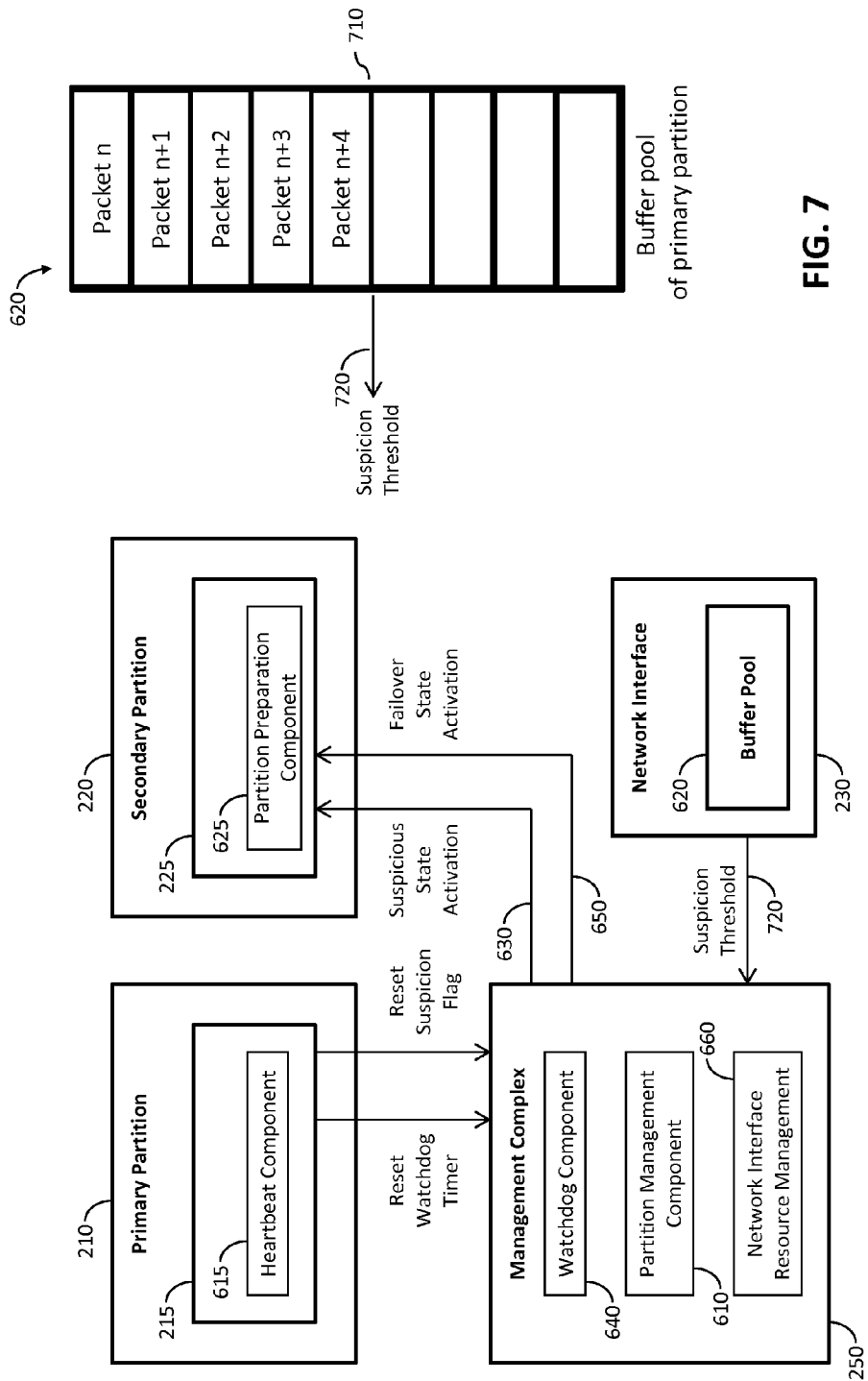

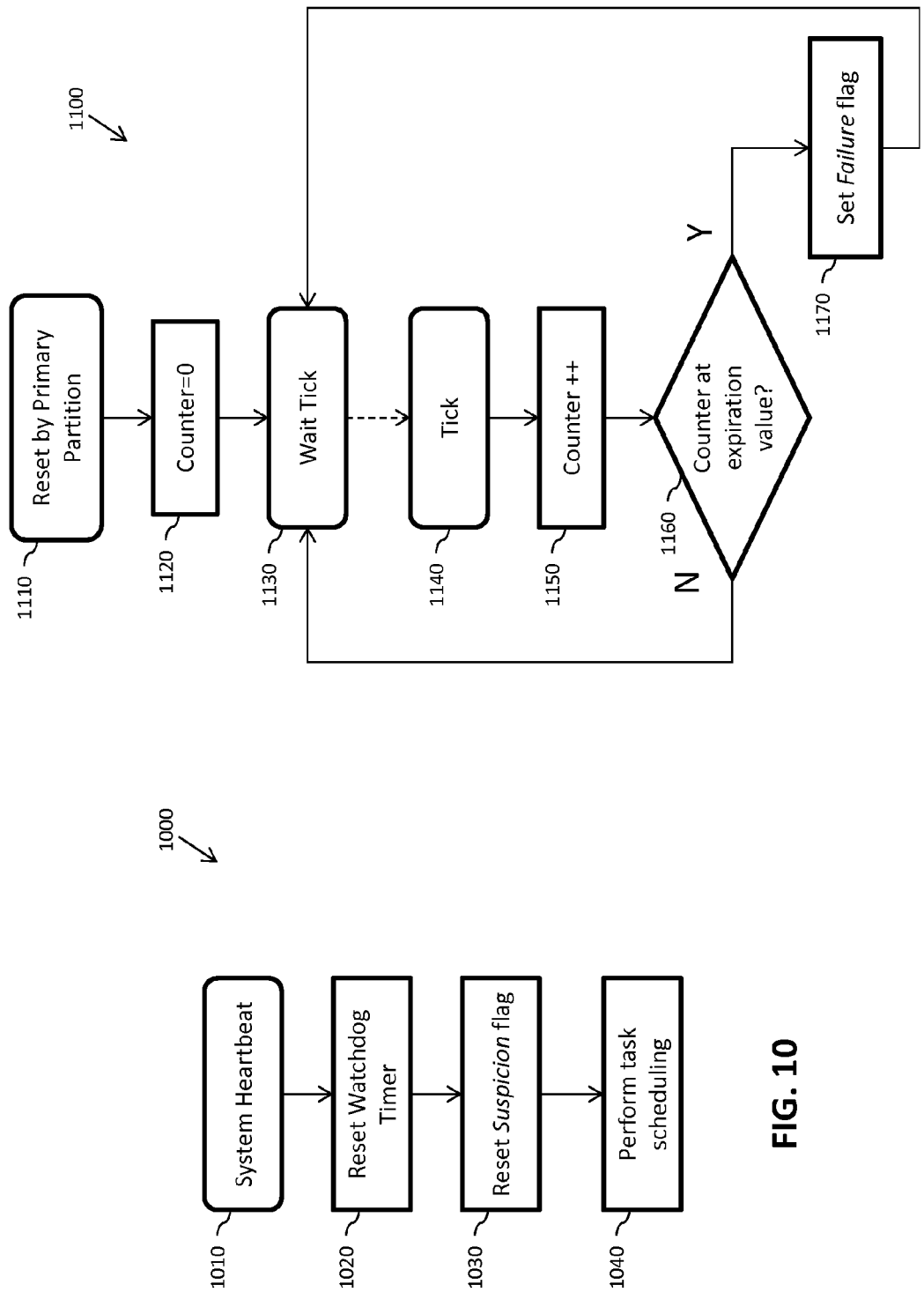

MULTI-PARTITION NETWORKING DEVICE AND METHOD THEREFOR

CROSS REFERENCE TO RELATED APPLICATION(S)

The present application is related to U.S. patent application Ser. No. 14/224,391, entitled "Network Processor for Managing a Packet Processing Acceleration Logic Circuitry in a Networking Device," filed on Mar. 25, 2014 the entirety of which is herein incorporated by reference.

The present application is related to U.S. patent application Ser. No. 14/551,645, entitled "Multi-Partition Networking Device," filed on Nov. 24, 2014 the entirety of which is herein incorporated by reference.

FIELD OF THE INVENTION

This invention relates to a multi-partition networking device and a method of managing a multi-partition networking system.

BACKGROUND OF THE INVENTION

Multi-partition systems for network applications are often implemented through the use of networking System-on-Chip (SoC) devices composed of multi-core clusters and a networking sub-module, with multi-partition software running on the multi-core clusters. In the field of such multi-partition systems, there is a class of system that offers high availability for cases where a partition fails. The high availability property is typically achieved for a particular (primary) partition through the use of a secondary partition which during normal operation is put into a standby state. Upon detection of a failure condition within the primary partition, the secondary partition may be brought out of its standby state, and operation switched from the failed primary partition to the secondary partition. Detection of a 'failure condition' is usually implemented by a watchdog mechanism, whereby upon a watchdog timer expiring as a result of the partition failing to reset the watchdog timer, a failure condition is deemed to have occurred.

FIG. 1 schematically illustrates operating states of a conventional multi-partition networking device 100. The multi-partition networking device 100 comprises a first (primary) partition 110 running on a first set of hardware resources, illustrated generally at 115, and a second (secondary) partition 120 running on second set of hardware resources, illustrated generally at 125. The multi-partition networking device 100 is arranged to operate in a first, normal operating state 102, whereby the first set of hardware resources 115 are in an active state (i.e. powered up and functional) and the first partition 110 is arranged to process inbound network traffic, for example received via network sub-module 130. In this first, normal operating state the second set of hardware resources 125 are in a standby state (e.g. in a powered down mode) to minimise power consumption of the multi-partition networking device 100. Upon the detection of a failure condition 140, the multi-partition networking device 100 is arranged to transition to a second, failover operating state 104, whereby the second set of hardware resources 125 are transitioned from a standby state to an active state (e.g. powered up and brought into an operational condition), and processing of inbound network traffic is transferred to the second partition 120. The first set of hardware resources 115 may then be transition into a standby state, for example powered down to minimise the power consumption of the multi-partition networking device 100. The multi-partition networking device 100 may be transitioned back to the first, normal operating state upon a resume condition 145 being detected.

In many networking systems, the requirement for the high availability system is to prevent packet loss in the case of a partition failure, and specifically to ensure the switch from the primary partition to the secondary partition does not include any loss of networking traffic. During the period from the time when failure occurs within the primary partition to the time when the secondary partition undertakes responsibility for processing network traffic, received network traffic is not being served and received data packets are required to be stored within a buffer pool (e.g. within the networking sub-module 130). This period of time when network traffic is not being served includes:
  (i) the time taken to detect the failure condition within the primary partition; and
  (ii) the time taken to bring the secondary partition out of standby state and into an operational condition.

The longer this non-serving period is, and the higher the rate of traffic served by the system, the larger the volume of data packets that are required to be held within the buffer pool, and thus the greater the required size of the buffer pool needed to store the incoming data packets in order to avoid loss of networking traffic.

The time taken to bring the secondary partition out of standby and into an operational condition typically includes:
  (i) the time it takes to bring the secondary partition out of deep sleep (i.e. to power up);
  (ii) the time taken to resume the relevant context; and
  (iii) getting into a 'hot' state where the local register values etc. are set correctly.

The time taken to bring the secondary partition out of standby and into an operational condition may be minimised by maintaining the secondary partition in a fully powered-up state. However, this significantly increases the power consumption of the overall system. As such, it is desirable for secondary partitions to remain powered down when not in use to minimise power consumption.

As such, in a conventional multi-partition system in which the secondary partition is powered down during normal operation, there can be a significant time lapse between the primary partition failing and operation being switched over to the secondary partition, requiring a large buffer to be implemented in order to prevent loss of network traffic. However, increasing the size of the buffer pool significantly increases the cost, power consumption and die area for the buffer pool. As such, there is a requirement to minimise the required size of the buffer pool in which received data packets are stored, and thus a requirement to minimise the period of time when network traffic is not being served.

SUMMARY OF THE INVENTION

The present invention provides a multi-partition networking device, a method of managing a multi-partition networking system and a non-transitory computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 6 illustrates a simplified block diagram of an example of the multi-partition networking device.

FIG. 7 schematically illustrates a buffer pool for a primary partition.

FIGS. 8 to 11 illustrate simplified flowcharts of an example of a method of managing a multi-partition networking system.

DETAILED DESCRIPTION OF THE PREFERRED EMBODIMENTS

The present invention will now be described with reference to the accompanying drawings. However, it will be appreciated that the present invention is not limited to the specific examples herein described and as illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 2:
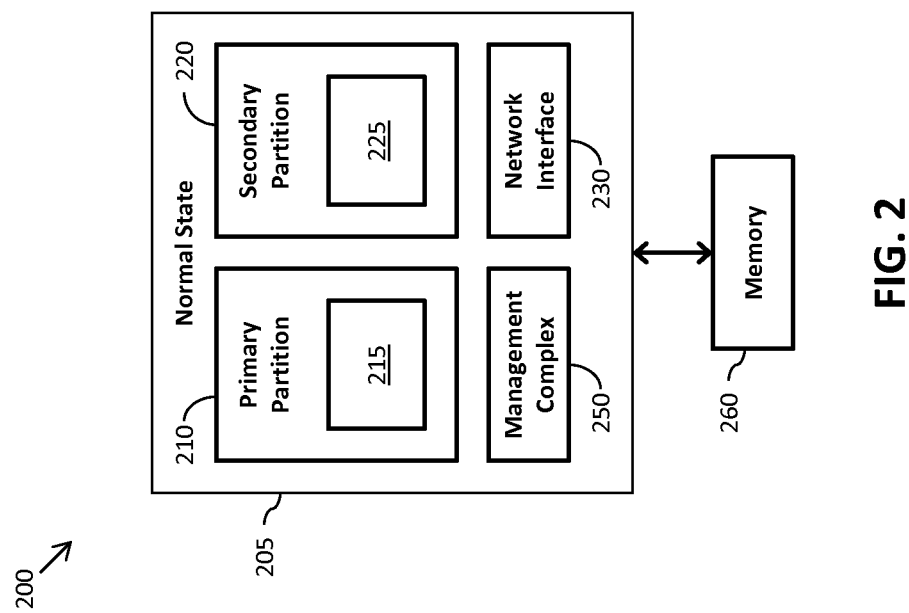
FIG. 2 illustrates a simplified block diagram of a multi-partition networking device.

Referring first to FIG. 2, there is illustrated a simplified block diagram of a multi-partition networking device 200. In the illustrated example, the multi-partition networking device 200 is implemented within an integrated circuit device 205 comprising at least one die within a single integrated circuit package. In some examples, the multi-partition networking device 200 may comprise a networking System-on-Chip (SoC) device composed of multi-core clusters and one or more networking sub-module, with multi-partition software running on the multi-core clusters.

In the example illustrated in FIG. 2, the multi-partition networking device 200 comprises a first, primary partition 210 running on a first set of hardware resources, illustrated generally at 215, and a second, secondary partition 220 running on second set of hardware resources, illustrated generally at 225. Such hardware resources 215, 225 may comprise, for example, processing cores, accelerator hardware components, memory components, etc. The multi-partition networking device 200 further comprises at least one network sub-module, such as the network interface 230 illustrated in FIG. 2. In the illustrated example, the multi-partition networking device 200 further comprises a management module 250. In some examples, such a management module 250 may comprise one or more processor(s) executing program code operable for managing the network interface resources and procedures that are shared among the various partitions. In some examples, and as described in greater detail below, such program code may also be operable for managing other aspects of the multi-partition networking device 200, such as managing the transition between different operating states of the multi-partition networking device 200. In the illustrated example, the program code may be stored within a non-transitory computer program product, such as the memory element illustrated generally at 260.

Figure 3:
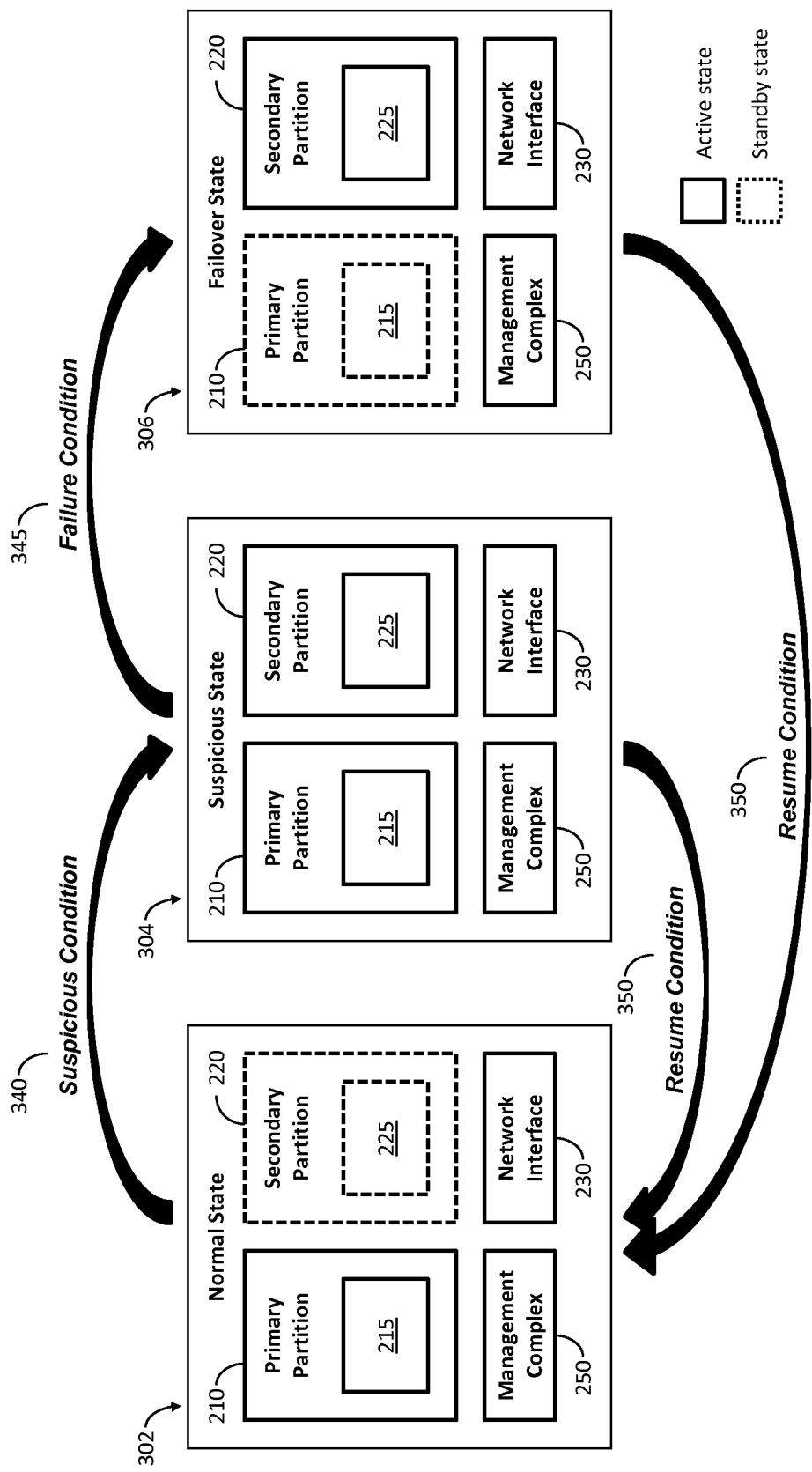
FIG. 3 schematically illustrates the multi-partition networking device operating in different operating states.

Referring now to FIG. 3, there is schematically illustrated the multi-partition networking device 200 operating in different operating states. The multi-partition networking device 200 is arranged to operate in a first, normal operating state 302, whereby the first set of hardware resources 215 are in an active state and the first partition 210 is arranged to process network traffic, for example received via network sub-module 230. In this first, normal operating state the second set of hardware resources 225 are in a standby state. Upon detection of a suspicious condition 340 within the primary partition 210, such as described in greater detail below, the multi-partition networking device 200 is arranged to transition to a second, suspicious operating state 304, whereby the second set of hardware resources 225 are transitioned from a standby state to an active state. In this suspicious state 304, processing of network traffic is still performed by the first partition 210. Upon the detection of a failure condition 345 within the primary partition 210, the multi-partition networking device 200 is arranged to transition to a third, failover operating state 306, whereby processing of network traffic is transferred to the second partition 220.

Figure 1:
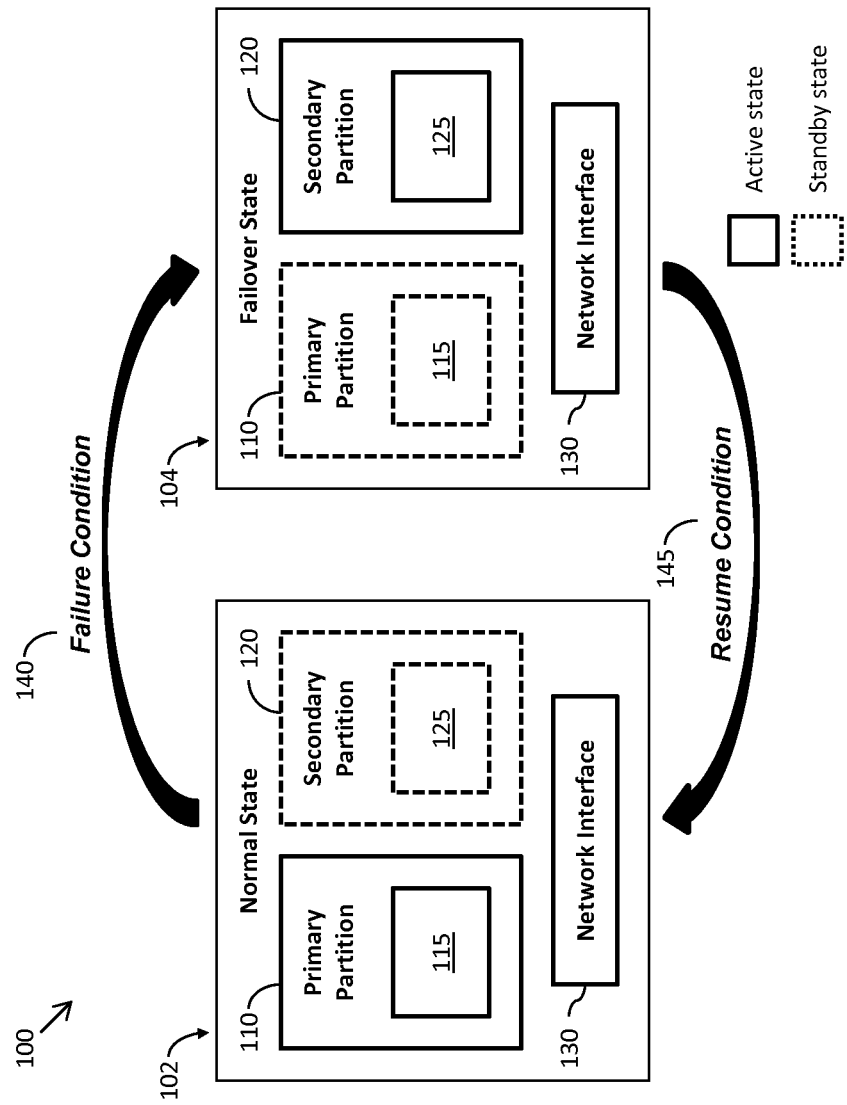
FIG. 1 schematically illustrates operating states of a conventional multi-partition networking device.
Figure 4:
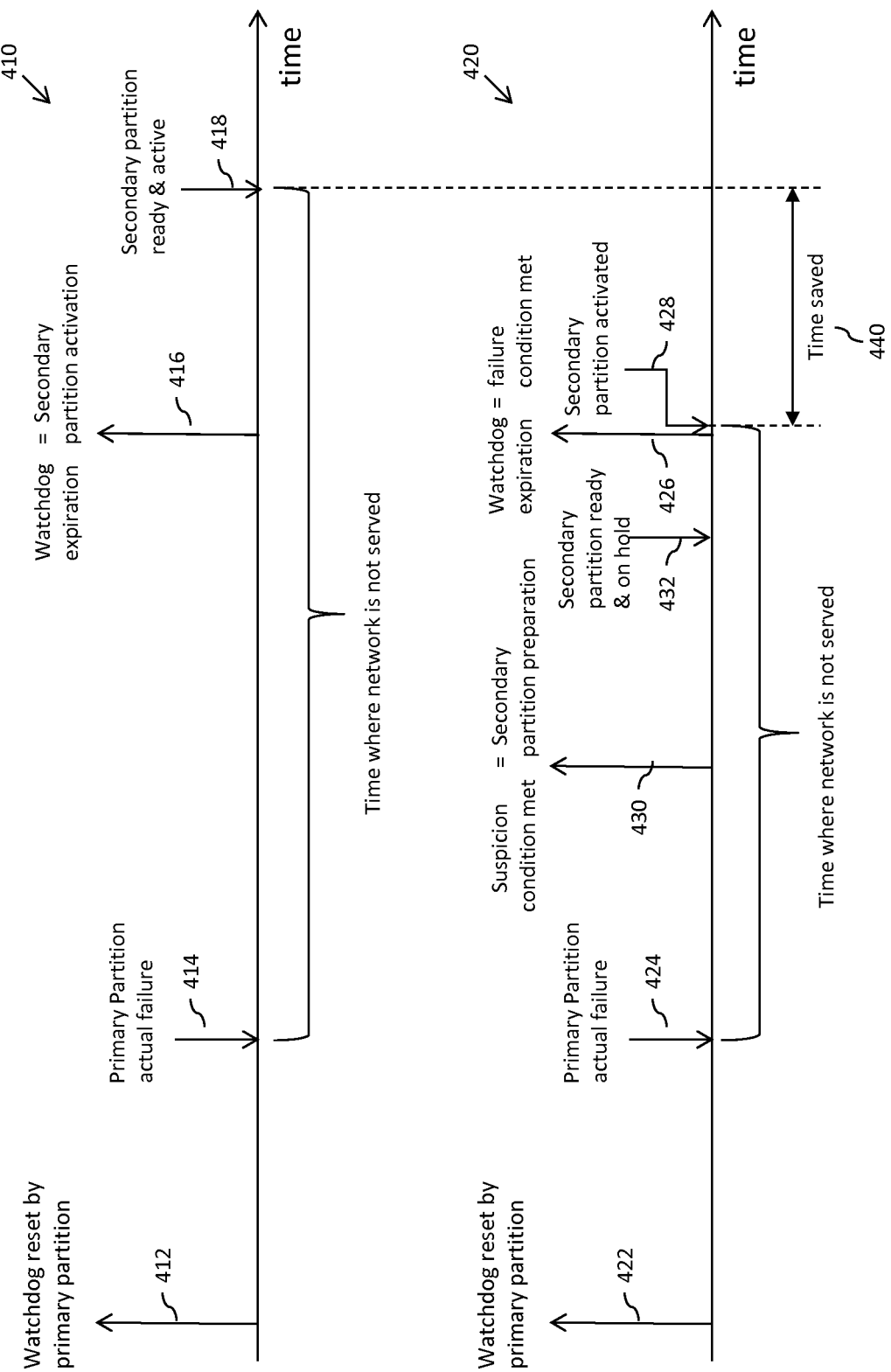
FIG. 4 schematically illustrates a comparison of timelines for primary partition failure responses between the conventional multi-partition networking device of FIG. 1 and the multi-partition networking device of FIGS. 2 and 3.

FIG. 4 schematically illustrates a comparison of timelines for primary partition failure responses between the conventional multi-partition networking device 100 of FIG. 1 and the multi-partition networking device 200 of FIGS. 2 and 3.

A first timeline 410 illustrates the sequence of events within the conventional multi-partition networking device 100 of FIG. 1. The timeline 410 starts at 412, with the primary partition 110 performing a watchdog reset. Such a watchdog reset by the primary partition 110 indicates that at this point in time the primary partition 110 is (seemingly) operating correctly. A failure within the primary partition 110 occurs at 414. The failure is not detected until the watchdog timer expires at 416, when the fact that the primary partition 110 failed to reset the watchdog indicates the occurrence of a failure within the primary partition 110. The expiry of watchdog timer at 416 constitutes a failure condition 140, triggering the transition of the conventional multi-partition networking device 100 from its normal operating state 102 to its failover operating state 104, whereby the second set of hardware resources 125 are transitioned from a standby state to an active state (e.g. powered up and brought into an operational condition), and processing of inbound network traffic is transferred to the second partition 120. As previously mentioned, the time taken to bring the secondary partition 120 out of standby and into an operational condition typically includes:

(iv) the time it takes to bring the secondary partition out of deep sleep (i.e. to power up);
(v) the time taken to resume the relevant context; and
(vi) getting into a 'hot' state where the local memories are set correctly.

As such, there is a delay between the expiry of watchdog timer at 416 (constituting the failure condition 140) and the secondary partition 120 being ready and active at 418, and able to have the processing of network traffic transferred thereto.

A second timeline 420 illustrates the sequence of events within the multi-partition networking device 200 of FIGS. 2 and 3. The timeline 420 starts at 422, with the primary partition 210 performing a watchdog reset. A failure within the primary partition 210 occurs at 424. The failure is not detected until the watchdog timer expires at 426, when the fact that the primary partition 210 failed to reset the watchdog indicates the occurrence of a failure within the primary partition 210.

However, a suspicious condition (such as described in greater detail below) is detected at 430, prior to the expiration of the watchdog timer at 416, triggering the transition of the multi-partition networking device 200 from its normal operating state 302 to its suspicious operating state 304, whereby the second set of hardware resources 225 are transitioned from a standby state to an active state (e.g. powered up and brought into an operational condition). The secondary partition 220 is ready and active at 432, and able to have the processing of network traffic transferred thereto, prior to the expiry of the watchdog timer at 426. The secondary partition 220 is held in this active state, whilst the responsibility for processing network traffic remains with the primary partition 210.

The subsequent expiry of watchdog timer at 426 constitutes a failure condition 340, triggering the transition of the multi-partition networking device 200 from its suspicious operating state 304 to its failover operating state 306, whereby the processing of inbound network traffic is transferred to the second partition 220. As the secondary partition 220 is already powered up and active, the transfer of the processing of inbound traffic thereto may be performed substantially immediately, at 428. As such, there is substantially no delay between the expiry of watchdog timer at 426 (constituting the failure condition 340) and the processing of inbound network traffic being transferred to the second partition 220, at 428.

Thus, the amount of time between a failure occurring within the primary partition 110, 210 and the processing of inbound network traffic being transferred to the second partition 120, 220 is significantly reduced within the multi-partition networking device 200 of FIGS. 2 and 3, as indicated at 440 in FIG. 4.

The implementation of such an intermediate 'suspicious state' to which the multi-partition networking device 200 is arranged to transition upon detection of a suspicious condition 340 enables the secondary partition 220 to be pre-emptively put into an active state ahead of a failure condition 345 being detected. In this manner, the secondary partition 220 is ready substantially immediately for the processing of network traffic to be transferred thereto upon detection of a failure condition 345, thereby significantly reducing the period of time when network traffic is not being served due to a failure within the primary partition 210, and thus significantly reducing the requirement for the buffer pool size. It also shortens the time the multi-partition networking device 200 is not operational (e.g., not processing network traffic) and as such shortens the latency for processing network traffic following a failure of the primary partition 210.

Figure 5:
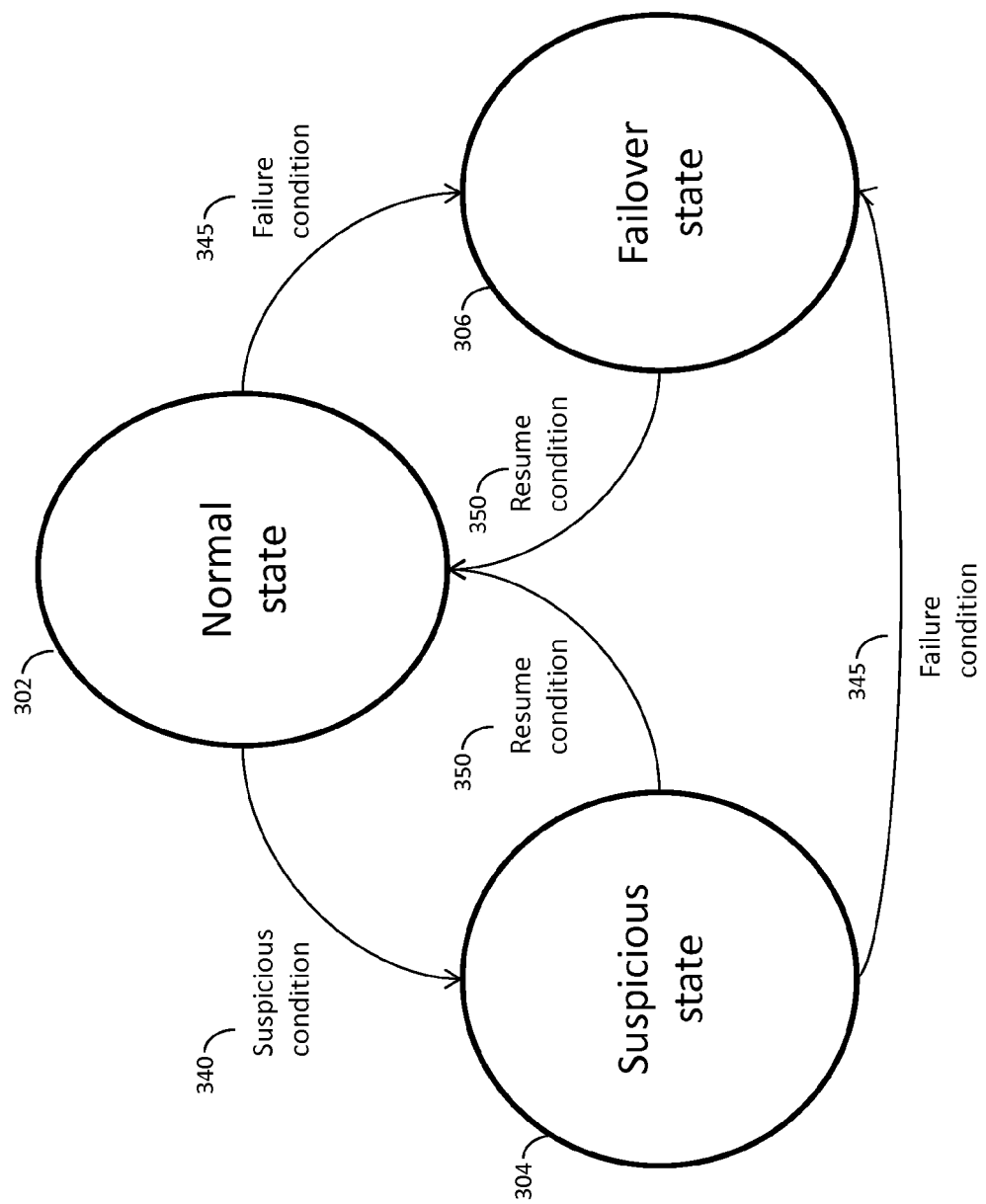
FIG. 5 illustrates a simplified state diagram for the multi-partition networking device of FIGS. 2 and 3.

FIG. 5 illustrates a simplified state diagram for the multi-partition networking device 200 of FIGS. 2 and 3. As previously described above, the multi-partition networking device 200 comprises the three operating states:
(i) normal operating state 302;
(ii) suspicious operating state 304; and
(iii) failover operating state 306.

In the first, normal operating state 302, the first set of hardware resources 215 are in an active state and the primary partition 210 is arranged to process network traffic, whilst the second set of hardware resources 225 are in a standby state. In the suspicious operating state 304, the first and second sets of hardware resources 215, 225 are in an active state and the primary partition 210 is arranged to process network traffic. In the failover operating state 306, at least the second set of hardware resources 225 is in an active state and the secondary partition 220 is arranged to process network traffic.

As will be appreciated by a person skilled in the art, in many systems the time it takes for the secondary partition to get ready to process network traffic is not just limited to powering up from a low power state. The secondary partition needs to retrieve context of the system, as such "learn" the state of the primary partition and getting the information regarding what tasks are open, which resources are being used etc. Retrieving the context of the system is needed even if the secondary partition and its relevant core are not in a low power down state. As such, it is to be understood that the 'standby state' that the secondary partition 220 is in during the normal operation state 302 of the multi-partition networking device 200 is not to be limited to low power states (e.g. a powered down state).

The multi-partition networking device 200 is arranged to transition from the normal operating state 302 upon either a suspicious condition 340 being detected or a failure condition 345 being detected. Upon a suspect condition 340 being detected, the multi-partition networking device 200 is arranged to transition from the normal operating state 302 to the suspicious operating state 304. Conversely, upon a failure condition 345 being detected, the multi-partition networking device 200 is arranged to transition from the normal operating state 302 to the failover operating state 306.

The multi-partition networking device 200 is arranged to transition from the suspicious operating state 304 upon either a failure condition 345 being detected or a resume condition 350 being detected. Upon a failure condition 345 being detected, the multi-partition networking device 200 is arranged to transition from the suspicious operating state 304 to the failover operating state 306. Conversely, upon a resume condition 350 being detected, the multi-partition networking device 200 is arranged to transition back to the normal operating state 302.

The multi-partition networking device 200 is arranged to transition from the failover operating state 306 to the normal operating state 302 upon a resume condition 350 being detected.

A suspicious condition 340 may comprise the occurrence of any event or condition capable of indicating the possibility of a failure having occurred within the primary partition 210 in advance of a failure condition 345 being detected. For example, a suspicious condition 340 may comprise one or more of:
  an occupancy level of a buffer pool for received network traffic exceeding a threshold level;
  inactivity within at least one transmission queue;
  inactivity within at least one task queue;
  a watchdog timer expiration (for example separate watchdog timers may be used for detecting a suspicious condition and detecting a failure condition, the former comprising a shorter duration than the latter); and
  an indication of a hardware resource going out of normal state.

A failure condition 345 may comprise the occurrence of any event or condition capable of indicating that a failure has occurred within the primary partition 210. For example, a failure condition 345 may comprise one or more of:

- a watchdog timer expiration;
- an indication of a hardware failure; and
- an indication of a non-correctable ECC (error-correcting code) fault.

A resume condition 350 may comprise, say, the ceasing of the suspicious condition and/or the failure condition that caused the multi-partition networking device 200 to transition to a suspicious or failover operating state.

FIG. 6 illustrates a simplified block diagram of an example of the multi-partition networking device 200. In the illustrated example, the multi-partition networking device 200 comprises the management module 250, which is arranged to detect the occurrence of suspicious conditions 340 within the primary partition 210, and to cause the multi-partition networking device 200 to transition to the suspicious state 304 upon detection of a suspicious condition 340. In the illustrated example, the management module 250 is further arranged to detect the occurrence of failure conditions 345 within the primary partition 210, and to cause the multi-partition networking device 200 to transition to the failover state 306 upon detection of a failure condition 345. In some examples, the management module 250 may further be arranged to cause the multi-partition networking device 200 to transition back to the normal state 302 upon detection of a resume condition 350.

In the illustrated example, the management module 250 comprises one or more hardware resources, for example comprising one or more processors, independent from the first and second partitions 210, 220 within the multi-partition networking device 200. An example of such a management module 250 is described in the Applicant's co-pending U.S. patent application Ser. No. 14/224,391 (the network processor 201 in said co-pending application), the subject-matter of which relating to said network processor 201 being incorporated herein by reference with respect to an example embodiment of the management module 250. Thus, in such an example the management module 250 comprises an independent entity within the multi-partition networking device 200 responsible for the management of network interface resources provided by the network sub-module 230, and procedures that are shared among the partitions 210, 220. In this manner, the management module 250 is able to monitor the state of, for example, buffer pools, queues, etc. and to detect various conditions occurring within the multi-partition networking device 200 independently from the partitions 210, 220. Advantageously, the management module 250 comprises a centralized entity "above" all partitions and can therefore:

- manipulate the partitions to backup each other; and
- allow sharing of resources across partitions.

In this manner, utilising such an independent management module 250 to detect conditions within the multi-partition networking device 200 and for controlling the operating states of the multi-partition networking device 200 allows a finer definition of conditions, such as a suspicious condition 340. For example, the fact that the management module is responsible for the management of network interface resources, such as data path acceleration circuitry etc., allows the management module 250 to monitor the state of buffer pools etc. used by a particular partition.

In the example illustrated in FIG. 6, the management module 250 comprises a partition management component 610 arranged to perform partition management tasks, and in particular arranged to detect the occurrence of a suspicious condition within (at least) the primary partition 210. Such a partition monitoring component 610 may comprise, for example, a process or the like. In some examples, it is contemplated to use the buffer pool in which received data packets are stored for processing by the primary partition 210 to detect a suspicious condition within the primary partition 210. In the example illustrated in FIG. 6, the buffer pool 620 is managed by the network sub-module 230. FIG. 7 schematically illustrates the buffer pool 620 for the primary partition 210. A suspicion threshold 710 may be set/configured for the buffer pool 620 to indicate late processing of received data packets by the primary partition 210. If the occupancy level of the buffer pool 620 exceeds the suspicion threshold 710, the network sub-module 230 may be arranged to output to the management module 250 a buffer pool threshold exceeded indication, for example by setting a suspicion threshold signal 720.

The partition management component 610 of the management module 250 may be arranged to periodically check the suspicion threshold signal 720 to determine whether a suspicious condition within the buffer pool 620 of the primary partition 210 has been detected. If the suspicion threshold signal 720 is set during such a check by the partition management component 610, the partition management component 610 may then cause the multi-partition networking device 200 to transition from its normal operating state 302 to its suspicious operating state 304, for example by setting a suspicious state activation signal 630 provided to the secondary partition 220. The secondary partition 220 may then be arranged, upon the suspicious state activation signal 630 being set, to transition the second set of hardware resources 225 from a standby state to an active state. For example, such a transition from a standby state to an active state may comprise powering up the second set of hardware resources 225, and initialising a partition preparation component 625 of the secondary partition 220 to retrieve and load the current context for the primary partition 210.

The partition management component 610 may further be arranged to subsequently detect the occurrence of a failure condition within the primary partition 210. For example, the management component 640 may comprise a watchdog component 640 comprising at least one watchdog timer (not shown) for the primary partition 210. Upon expiry of the watchdog timer for the primary partition 210, the watchdog component 640 may set a failure flag (not shown) for the primary partition 210. A heartbeat component 615 of the primary partition 210 is arranged to periodically reset the watchdog timer for the primary partition 210. In this manner, as long as the heartbeat component 615 continues to reset the watchdog timer, the failure flag will remain unset. However, should the heartbeat component 615 of the primary partition 210 fail to reset the watchdog timer, the failure flag will be set indicating the occurrence of a failure condition within the primary partition 210. The partition management component 610 may then cause the multi-partition networking device 200 to transition from a suspicious operating state 304 to a failover operating state 306, for example by setting a failover state activation signal 650 provided to the secondary partition 220. The secondary partition 220 may then be arranged, upon the failover state activation signal 650 being set, to take over responsibility for processing network traffic from the primary partition. The partition monitoring component 610 of the management module 250 may also be arranged to instruct a network interface resource management component 660 of the management module 250 to reallocate network resources from the primary partition 210 to the secondary partition 220.

The heartbeat component 615 of the primary partition may also be arranged to reset a suspicious condition flag when resetting the watchdog timer to cause the partition monitoring component of the management module 250 to transition the multi-partition networking device 200 back to a normal operating state 302 if operating in a suspicious operating state 304.

Referring now to FIGS. 8 to 11 there are illustrated simplified flowcharts of an example of a method of managing a multi-partition networking system, such as may be implemented within the multi-networking device 200 herein before described with reference to FIGS. 2 to 7.

Figure 8:
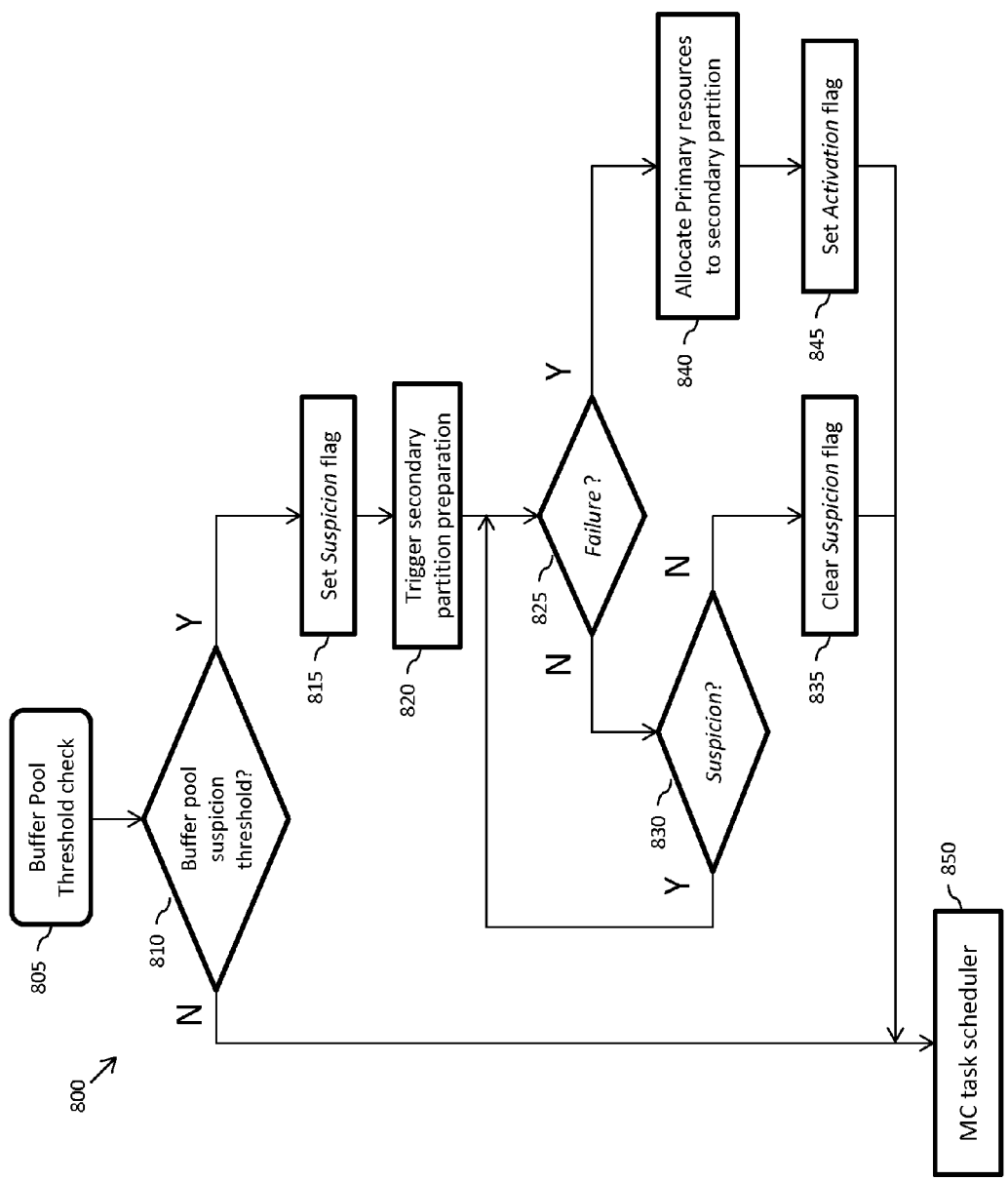

Referring first to FIG. 8 there is illustrated a simplified flowchart 800 of an example of a first part of the method of managing a multi-partition networking system, such as may be implemented within the partition management component 610 of the management module 250 of FIGS. 2 to 7. This part of the method starts at 805 where one or more parameters are checked to determine whether a suspicious condition has occurred. In the illustrated example, a check is performed to determine whether an occupancy level for a buffer pool of a primary partition for received network traffic exceeds a threshold, for example determining whether the suspicion threshold signal 720 is set. Moving on to 810, if it is determined that a suspicious condition has not occurred, e.g. that the suspicion threshold signal 720 is not set, the method moves on to 850 where this part of the method exits to, say, a task scheduler (not shown) for the management module 250 where a next pending task is schedule to be performed.

Conversely, if it is determined that a suspicious condition has occurred, e.g. that the suspicion threshold signal 720 is set, the method moves on to 815 where, in the illustrated example, a suspicion flag is set. Activation of the secondary partition 220 is then triggered, at 815, for example by way of generating the suspicious state activation signal 630 provided to the secondary partition 220 to cause the second set of hardware resources 225 to transition from a standby state to an active state. In this manner, the multi-partition networking device 200 is transition from a first, normal operating state 302 to a second, suspicious operating state 304. In the illustrated example, this part of the method then waits until a failure condition within the primary partition 210 is detected, at 825, or the suspicious condition is cleared, at 830. If a failure condition is detected, at 825, the method moves on to 840 where network resources are reallocated from the primary partition 210 to the secondary partition 220, and an activation flag is set at 845, for example setting the failover state activation signal 650 provided to the secondary partition 220. The secondary partition 220 may then, upon the failover state activation signal 650 being set, take over responsibility for processing network traffic from the primary partition. The method then moves on to 850 where this part of the method exits to, say, a task scheduler (not shown) for the management module 250 where a next pending task is schedule to be performed. In this manner, the multi-partition networking device 200 is transition from the second, suspicious operating state 304 to a third, failover operating state 306.

Conversely, if the suspicious condition is reset at 830, the suspicion flag is cleared at 835. The method then moves on to 850 where this part of the method exits to, say, a task scheduler (not shown) for the management module 250 where a next pending task is schedule to be performed.

Figure 9:
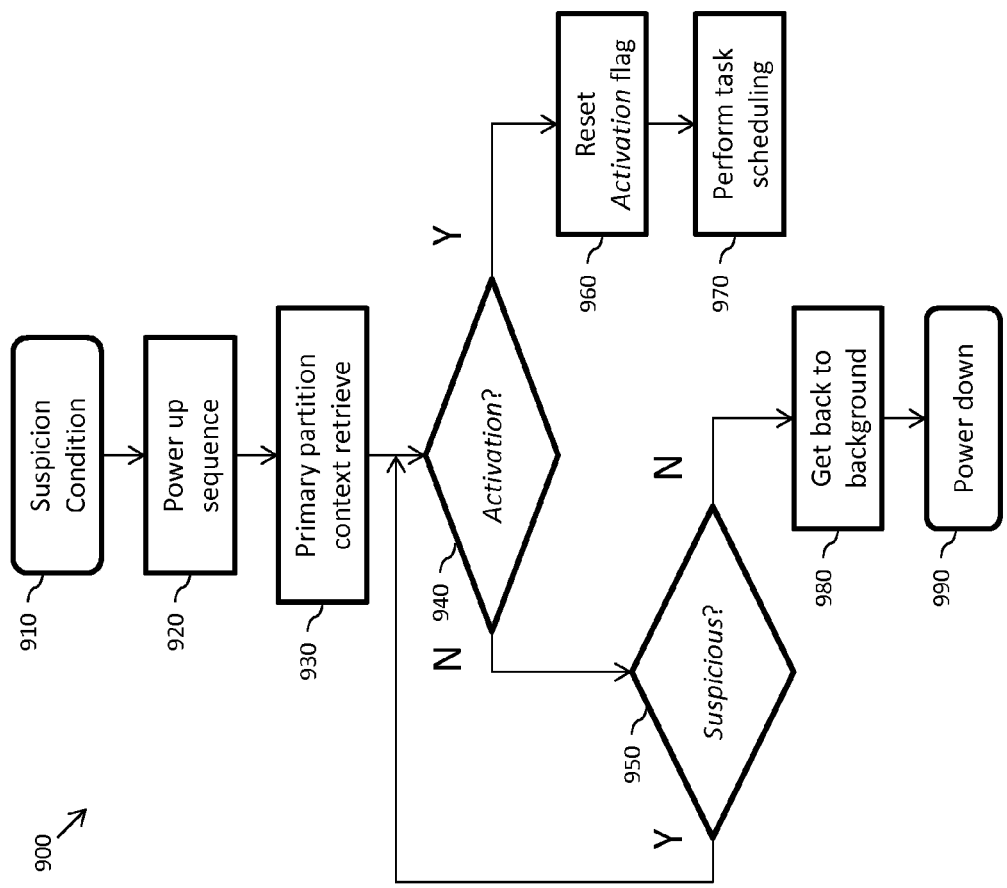

Referring now to FIG. 9, there is illustrated a simplified flowchart 900 of an example of a further part of the method of managing a multi-partition networking system, such as may be implemented within the secondary partition 220. This part of the method starts at 910 with the receipt of an indication that a suspicious condition has been detected, and that the multi-partition networking device is transitioning to a suspicious operating state 304. For example, such an indication may comprise the suspicious state activation signal 630 being set. In the illustrated example, this part of the method then moves on to 920 where a power up sequence for the hardware resources 225 within the secondary partition 220 is initiated to bring the secondary partition 220 out of a low power/deep sleep state. Next, at 930, a current context for the primary partition 210 is retrieved and loaded into the secondary partition 220. In this manner, upon the suspicious state activation signal 630 being set, the hardware resources 225 of the secondary partition are transitioned to an active state comprising, in the illustrated example, the hardware resources being powered up and a current context for the primary partition being loaded into the secondary partition.

In the illustrated example, this part of the method then waits until a failover state activation signal is received at 940, such as the setting of the failover state activation signal 650, or the suspicious condition is cleared at 950, for example as indicated by the clearing of the suspicious state activation signal 630. If a failover state activation signal is received at 940, the method moves on to 960 where, in the illustrated example, the activation flag is reset to indicate successful activation of the secondary partition 220, and the secondary partition 220 then undertakes responsibility for processing network traffic, at 970.

Conversely, if the suspicious condition is cleared at 950, the secondary partition returns to a background state at 980, and then in the illustrated example powers down at 990.

Referring now to FIG. 10, there is illustrated a simplified flowchart 1000 of an example of a further part of the method of managing a multi-partition networking system, and in the illustrated example comprises a system heartbeat task running within the primary partition 210, such as may be implemented by way of the heartbeat component 615. This part of the method starts at 1010 with the system heartbeat task being scheduled, and moves on to 1020 where a watchdog timer for the primary partition 210 is reset. In the illustrated example, a suspicion flag is also reset at 1030. In this manner, if a suspicious condition had previously been detected and the multi-partition networking system transitioned to a suspicious operating state, resetting the suspicion flag in this manner may act as a resume condition, in response to which the multi-partition networking system may be transitioned back to a normal operating state. The method then moves on to 1040 where this part of the method exits to, say, a task scheduler (not shown) for the primary partition 210 where a next pending task is schedule to be performed.

Referring now to FIG. 11, there is illustrated a simplified flowchart 1100 of an example of a further part of the method of managing a multi-partition networking system, such as may be implemented within the watchdog component 640 of the management module 250. This part of the method starts at 1110 with the receipt of a watchdog reset signal from the primary partition 210. A watchdog counter is reset (e.g. set to zero) at 1120, and this part of the method moves on to 1130 where the next watchdog tick is awaited. Upon the next watchdog tick occurring, at 1140, the method moves on to 1150, where the watchdog counter is incremented. It is then determined whether the watchdog counter has reached its expiry value. If the watchdog counter has not reached its expiry value, the method loops back to 1130 where the method awaits the next watchdog tick. Conversely, if the watchdog counter has reached its expiry value, the method moves on to 1170 where a failure flag is set indicating a failure condition within the primary partition 210. The method then loops back to 1130 where the method awaits the next watchdog tick.

In the various examples hereinbefore described and as illustrated in the accompanying drawings, the present invention has been described in terms of detecting the occurrence of a suspicious condition based on an occupancy level within the buffer pool 620. However, it is contemplated that other events and/or conditions may additionally/alternatively be used to indicate the occurrence of a suspicious condition. For example, the partition management component 610 may additionally/alternatively be arranged to monitor transmission queues within the network sub-module 230, task queues within the primary partition etc., and to detect, say, inactivity of such queues which may be interpreted as indicating a suspicious condition within the primary partition. Additionally/alternatively, the watchdog component 640 of the management module 250 may be configured with two expiry values. For example, a first (higher) value may be used to set the failure flag as illustrated in FIG. 11, and a second (lower) value may be used to set a suspicious flag. In this manner, the suspicious flag is set prior to the failure flag, indication that a suspiciously long time has elapsed since the last watchdog reset by the primary partition 210, but not yet a long enough period to constitute a failure condition. Other indications such as a hardware resource within the primary partition 210 going out or a normal state or the like may additionally/alternatively be used to indicate the occurrence of a suspicious condition within the primary partition 210.

As described above, and in particular with reference to FIG. 4, the implementation of an intermediate 'suspicious state' to which a multi-partition networking system is arranged to transition upon detection of a suspicious condition enables the secondary partition to be pre-emptively put into an active state ahead of a failure condition being detected. In this manner, the secondary partition is ready substantially immediately for the processing of network traffic to be transferred thereto upon detection of a failure condition, thereby significantly reducing the period of time when network traffic is not being served due to a failure within the primary partition, and thus significantly reducing the requirement for the buffer pool size. It also shortens the time the multi-partition networking device 200 is not operational (i.e. not processing network traffic) and as such shortens the latency for processing network traffic following a failure of the primary partition.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of:

a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals.

Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A multi-partition networking device comprising at least one primary partition running on a first set of hardware resources and at least one secondary partition running on at least one further set of hardware resources; wherein the multi-partition networking device is arranged to:
   operate in a first operating state, whereby the first set of hardware resources are in an active state and the primary partition is arranged to process network traffic and the at least one further set of hardware resources are in a standby state;
   transition to a second operating state upon detection of a suspicious condition within the primary partition, whereby the at least one further set of hardware resources are transitioned from a standby state to an active state;
   transition to a third operating state upon detection of a failure condition within the primary partition, whereby processing of network traffic is transferred to the secondary partition; and
   the multi-partition networking device further comprising;
      a management module, the management module arranged to detect the occurrence of at least one suspicious condition within the primary partition, and to cause the multi-partition networking device to transition to the second operating state upon detection of the at least one suspicious condition within the primary partition; and
      a network sub-module arranged to:
         detect when an occupancy level for at least one buffer pool for received network traffic exceeds a threshold; and
         output to the management module a buffer pool threshold exceeded indication, upon detection of an occupancy level for the at least one buffer pool exceeding the threshold.

2. The multi-partition networking device of claim 1, wherein the management module is further arranged to detect the occurrence of at least one failure condition within the primary partition, and to cause the multi-partition networking device to transition to the third operating state, upon detection of the at least one failure condition within the primary partition.

3. The multi-partition networking device of claim 1, wherein the management module is further arranged to cause the multi-partition networking device to transition to the first operating state, upon detection of a resume condition.

4. The multi-partition networking device of claim 1, wherein a suspicious condition comprises at least one from a group comprising at least one of:
   an occupancy level of at least one buffer pool for received network traffic exceeding a threshold level;

inactivity within at least one transmission queue;
inactivity within at least one task queue;
a watchdog timer expiration; and
an indication of a hardware resource going out of normal state.

5. The multi-partition networking device of claim 1, wherein a failure condition comprises at least one from a group comprising at least one of:
a watchdog timer expiration;
an indication of a hardware failure; and
an indication of a non-correctable ECC fault.

6. The multi-partition networking device of claim 1, wherein transitioning the at least one further set of hardware resources from a standby state to an active state comprises loading a current context for the primary partition into the secondary partition.

7. The multi-partition networking device of claim 1, wherein transitioning the at least one further set of hardware resources from a standby state to an active state comprises powering up at least a part of the at least one further set of hardware resources.

8. The multi-partition networking device of claim 1 implemented within an integrated circuit device comprising at least one die within a single integrated circuit package.

9. The multi-partition networking device of claim 2, wherein the management module is further arranged to cause the multi-partition networking device to transition to the first operating state, upon detection of a resume condition.

10. The multi-partition networking device of claim 2, wherein multi-partition networking device comprises at least one network sub-module arranged to:
detect when an occupancy level for at least one buffer pool for received network traffic exceeds a threshold; and
output to the management module a buffer pool threshold exceeded indication, upon detection of an occupancy level for the at least one buffer pool exceeding the threshold.

11. The multi-partition networking device of claim 3, wherein multi-partition networking device comprises at least one network sub-module arranged to:
detect when an occupancy level for at least one buffer pool for received network traffic exceeds a threshold; and
output to the management module a buffer pool threshold exceeded indication, upon detection of an occupancy level for the at least one buffer pool exceeding the threshold.

12. A method of managing a multi-partition networking system comprising at least one primary partition running on a first set of hardware resources and at least one secondary partition running on at least one further set of hardware resources; the method comprising:
configuring the multi-partition networking system to operate in a first operating state, whereby the first set of hardware resources are in an active state and the primary partition is arranged to process network traffic and the at least one further set of hardware resources are in a standby state;
causing the multi-partition networking system to transition to a second operating state upon detection of a suspicious condition within the primary partition, whereby the at least one further set of hardware resources are transitioned from a standby state to an active state;
causing the multi-partition networking system to transition to a third operating state upon detection of a failure condition within the primary partition, whereby processing of network traffic is transferred to the secondary partition; and
detecting when an occupancy level for at least one buffer pool for received network traffic exceeds a threshold; and
determining the occurrence of the suspicious condition within the primary partition upon detection of an occupancy level for the at least one buffer pool exceeding the threshold.

13. A non-transitory computer program product having executable program code stored therein for managing a multi-partition networking system comprising at least one primary partition running on a first set of hardware resources and at least one secondary partition running on at least one further set of hardware resources, the program code operable for:
configuring the multi-partition networking system to operate in a first operating state, whereby the first set of hardware resources are in an active state and the primary partition is arranged to process network traffic and the at least one further set of hardware resources are in a standby state;
causing the multi-partition networking system to transition to a second operating state upon detection of a suspicious condition within the primary partition, whereby the at least one further set of hardware resources are transitioned from a standby state to an active state;
causing the multi-partition networking system to transition to a third operating state upon detection of a failure condition within the primary partition, whereby processing of network traffic is transferred to the secondary partition;
detecting when an occupancy level for at least one buffer pool for received network traffic exceeds a threshold; and
determining the occurrence of the suspicious condition within the primary partition upon detection of an occupancy level for the at least one buffer pool exceeding the threshold.

14. The non-transitory computer program product of claim 13, wherein the non-transitory computer program product comprises at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *